Dec. 6, 1960 W. J. METZGER 2,963,174
CAR COUPLER
Filed July 12, 1957 5 Sheets-Sheet 1

INVENTOR.
WILLIAM J. METZGER
BY Henry Kozak
ATTORNEY

Fig.3a

Dec. 6, 1960  W. J. METZGER  2,963,174
CAR COUPLER
Filed July 12, 1957  5 Sheets-Sheet 3

INVENTOR.
WILLIAM J. METZGER
BY *Henry Kozak*
ATTORNEY

Dec. 6, 1960 W. J. METZGER 2,963,174
CAR COUPLER
Filed July 12, 1957 5 Sheets-Sheet 5

INVENTOR.
WILLIAM J. METZGER
BY Henry Kozak
ATTORNEY

# United States Patent Office 2,963,174
Patented Dec. 6, 1960

2,963,174

CAR COUPLER

William J. Metzger, East Cleveland, Ohio, assignor to National Malleable and Steel Castings Company, Cleveland, Ohio, a corporation of Ohio Filed July 12, 1957, Ser. No. 671,553

16 Claims. (Cl. 213—100)

This invention relates to automatic car couplers for railway vehicles, and more specifically to a tight-locking coupler of less weight than those currently in use on the conventional vehicles of American railways, such coupler being particularly adapted for use on trains comprising cars of less weight than that of such conventional vehicles.

The present trend in railway vehicles and especially passenger car equipment is toward lightweight, low-slung designs which provide, among other things, better riding qualities, more economy of operation and greater ease in handling than with the vehicles of the conventional American design now in prevalent use on American railways. With the lower center of gravity of the new cars and resultant lower floor levels, it is also desirable to lower the position of the coupler with respect to the car and to the top of the rails of the track bed. Present standard types of coupling devices, because of their size or operating principle, are generally not satisfactory for this low-slung design of train.

An earlier application, Serial No. 613,133, filed October 1, 1956, discloses a lightweight tight-locking car coupler possessing the necessary strength requirements and comprising a comparatively low-depth head, a spring-actuated coupling hook mounted in the head for inter-locking engagement with the hook of an opposing similar coupler when the couplers are in coupled position, and wings extending laterally from the head for gathering and aligning the coupler during coupling operations. The wings also embody means adapted for cooperation with complementary means on the opposing coupler to prevent relative lateral and vertical movement of the couplers when in coupled position. In addition, the invention, as disclosed in application Ser. No. 613,133, provides automatic coupling mechanism formed integrally with the coupler head for the air, steam and electrical service lines of the train, thus eliminating the necessity of flexible hose couplings between train units.

The present invention is directed toward an improved form of coupler of the type disclosed in said application and is especially concerned with the construction of the coupling hook and of the laterally extending wings of the coupler to provide enhanced gathering and aligning characteristics during coupling operations. More particularly, the present invention provides an aligning flange on the outer end of one of the wings, an improved arrangement of aligning surfaces on the wings, a more compact combination of the aligning wings with the abutment face of the coupler, and a more elaborate system of guide surfaces on the forward end of the coupling hook of the coupler to produce wider, and more positive and efficient aligning and gathering of opposing couplers during coupling operations. It will be understood by those skilled in the art, that the proper gathering and aligning of opposing couplers, even under the worst possible, presently-found conditions of vertical and lateral displacement is highly essential in order to provide an advantageous coupling mechanism. The instant arrangement assures proper and facile coupling of opposing couplers, even when displaced three inches laterally to either side of the coupling line of the coupler and three inches vertically above or below the coupling line, to thus provide for all existing conditions of coupler misalignment.

Therefore, the primary object of the invention is to provide an automatic tight-locking mechanism particularly adapted for use on lightweight trains and comprising improved means for aligning and gathering the coupler during coupling operations.

A further object of the invention is to provide a comparatively lightweight tight-lock type railway car coupler that couples automatically upon impact with an opposing similar coupler without the necessity of any prior actuation of, or attention to, the mechanism and which comprises improved aligning and gathering means that are positive and efficient in operation.

Another object is to provide a coupler in which the aligning wings are combined with the abutment face of the coupler in a compact manner.

A more specific object of the invention is to provide a tight-lock coupler having a low depth head and comprising laterally extending gathering and aligning wings which embody improved projection and pocket structure adapted to cooperate with complementary structure on the wings of a similar opposing coupler to align the couplers during coupling operations and prevent lateral or vertical displacement of the couplers when in coupled position and wherein one of the wings comprises an aligning flange extending generally diagonally forwardly from the outer end thereof.

Another specific object of the invention is to provide a car coupler of the latter-mentioned type comprising a horizontally pivoted coupling hook mounted in and extending forwardly of the coupler head and wherein the front end of the hook comprises a novel arrangement of guide surfaces to aid in accomplishing positive and efficient aligning of opposing couplers when the latter are displaced laterally or vertically or both, relative to one another during coupling operations.

Other objects and advantages of the invention will be apparent from the following description, taken in conjunction with the drawings, in which.

In the following description, the terms "inboard" and "outboard" are used in reference to that which faces inwardly or outwardly, respectively, with respect to a vertical center plane of the coupler, or is disposed laterally inwardly or outwardly, respectively, with respect to another reference portion of the coupler.

Referring to the drawings, there is shown a coupler 10 having a hollow head 12 with an integral shank 14 received within a yoke 16 and secured thereto by a vertical pin 17 extending through an opening 18 in the shank. The opening contains a bearing block 19 in slidable engagement with pin 17 and having complementary arcuate thrust engagement with the shank. The connection between the coupler shank and yoke is such as to allow both horizontal and vertical angling of the coupler. The coupler is resiliently supported on car body structure 20 by conventional coupler carrier support mechanism 21. It will be noted that support mechanism 21 permits both vertical and horizontal angling of the coupler with respect to the car underframe.

Figure 1:
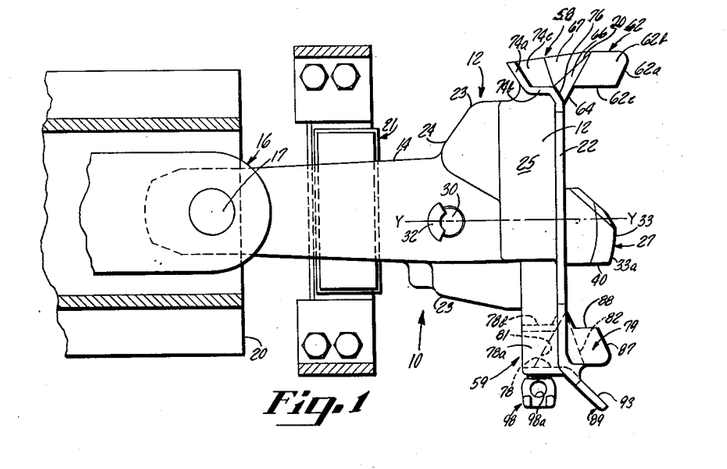
Fig. 1 is a plan view of the novel coupler showing a conventional method of mounting the coupler on the associated car.
Figure 3:
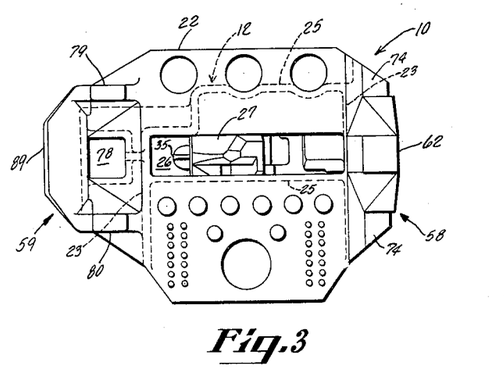
Fig. 3 is a front elevational view of the coupler.
Figure 3A:
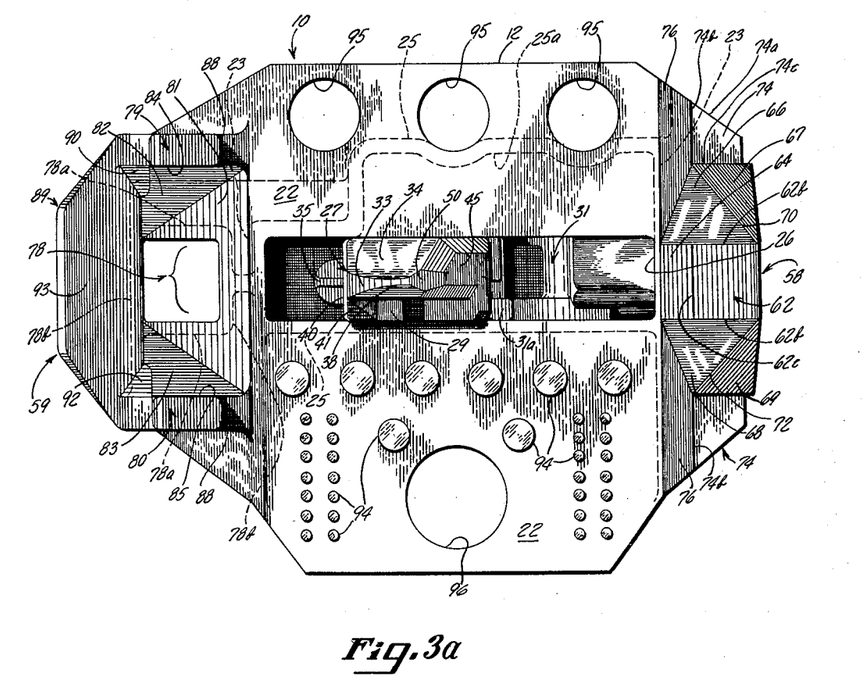
Fig. 3a is an enlarged view of Fig. 3.

The coupler head 10 is of hollow, polyhedral-like configuration comprising in general a front face plate 22, side walls 23, rear wall 24, and top and bottom walls 25 (Figs. 1 and 3). Top wall 25 is offset upwardly over a portion of its width to provide an upper top wall portion 25a defining an upper chamber portion in the head (Fig. 3). Face plate 22 is disposed at substantially right angles to the longitudinal axis of the coupler and comprises a transverse opening 26 therein through which coupling hook 27 projects.

Coupling hook 27 comprises a body portion 27a (Fig. 10) having a vertically extending opening 28 in the rearward end thereof and a hook-shaped head portion 27b adapted for engaging the corresponding portion of another hook. Portion 27b has a recess 29 in the front face thereof for receiving uncoupling means on an opposing coupled coupler. As disclosed in the aforementioned application Ser. No. 613,133, the uncoupling means comprises a horizontal arm 31a on a cam member 31 (Fig. 3) for extending into the recess 29 in the front face of the hook of an opposing coupled coupler and which is adapted to pivot the opposing hook out of coupling position upon actuation of the uncoupling means. Hook 27, as seen in Fig. 3, is supported on the bottom wall 25 of the coupler head and is pivotally mounted on the latter for movement in a horizontal ambit by means of pin 30. Pin 30 extends through openings in the top and bottom walls 25 of the head and is adapted to receive the full pulling force of the opposing coupled coupler. Pin 30 is supported in the head by pin support mechanism (not shown) and is limited in its upward movement by a flange-like extension 32 of the top wall 25.

In a similar manner, as in the aforementioned application Ser. No. 613,133, the outer side of hook member 27 at the rearward end thereof is provided with a laterally extending ledge 35 for abutting engagement with the forward end of spring means 36 (Fig. 13) in the coupler head. The rearward end of spring means 36 is received in a pocket portion in rear wall 24 of the coupler head. Spring 36 is assembled under a slight initial compression to urge hook 27 into coupling position.

The front end 33 of the hook is generally forwardly tapered and extends rearwardly from its front end in a transverse direction, as at 33a, toward the outboard side thereof, in a similar manner, and for the same purpose as in the aforementioned application Ser. No. 613,133.

In accordance with the invention, the front face of the coupling hook is formed with the following described plurality of generally angularly disposed, relatively flat, guide surfaces for aiding in providing positive and facile aligning of the couplers during coupling operations, as will be hereinafter discussed. In general, the front-face guide surfaces of the hook consist of upper and lower bevel surfaces, and crown surfaces disposed at a level between the upper and lower bevel surfaces.

Top guide bevel surface 34, which is of slightly convex configuration in a transverse direction, slopes upwardly and rearwardly from the front crown surface 33 of the hook and merges with generally horizontal top surface 36 thereof. Surface 34 is disposed almost entirely outboardly of the longitudinal vertical center plane Y—Y (Figs. 1 and 9) passing through the vertical axis of the pin-receiving opening 28 in the hook. In a lateral direction from the center plane Y—Y, the surface 34 extends slightly arcuately at approximately uniform width. In the longitudinal direction of the hook, the surface 34 extends diagonally upwardly and rearwardly with increase in the transverse length thereof. A generally flat guide surface 38 slopes downwardly and rearwardly from front surface 33 and merges with undersurface 29a, defining the upper extremity of the aforementioned opening 29 in the hook. A lower bevel surface 38 is disposed entirely outboardly of center plane Y—Y and in transverse direction extends generally perpendicularly to center plane Y—Y. At its outboard end, surface 38 merges with outboard side surface 40 of the hook. Triangularly shaped, generally flat guide surface 41 is disposed adjacent the outboard extremity of recess 29 and slopes generally downwardly and rearwardly approximately in the same plane as the surface 38 from the outermost extremity thereof to merge with the bottom, substantially horizontal surface 42 of the hook. Extending inboardly from surface 41 in a diagonally rearward direction is substantially flat, generally vertically disposed guide or gathering surface 43. Surface 43 at its outboard end merges with surface 41 along a diagonally and rearwardly extending line 43a and at its inboard end merges with abutment surface 44 partially defining the outboard side of recess 29. Surface 44 is substantially the same as the corresponding surface on the coupling hook of the aforementioned application Ser. No. 613,133. Surface 43 is tapered rearwardly at a sufficient angle to insure proper gathering of the aforementioned arm portion 31a of the uncoupling means of the opposing coupler for all possible angled positions of the arm, which as previously described is adapted to be received in opening 29 during coupling operations.

Figure 9:
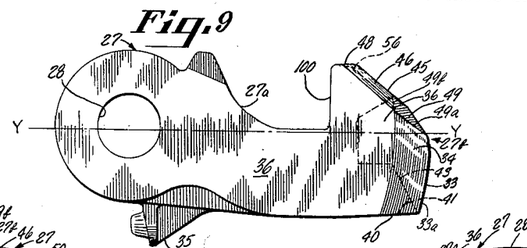
Figs. 9, 9a, 9b are enlarged plan, lowerside perspective, and upper-side perspective views, respectively, of the coupling hook of the coupler, showing the novel arrangement of guiding surfaces on the front of the hook which provides for positive and efficient aligning of the coupler during coupling operations.
Figure 9A:
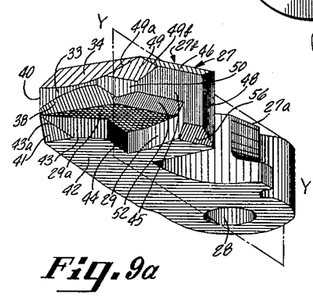
Figure 9B:
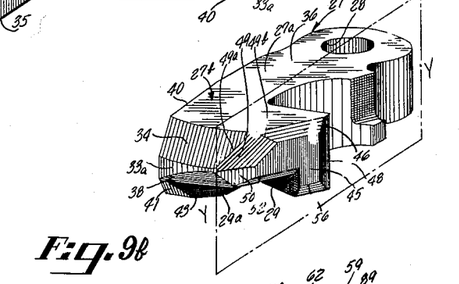

The hook-engaging head portion 27b of the hook is generally forwardly tapered as the result of its inner side extending outwardly and rearwardly in a transverse direction, as defined by the generally flat vertical surface 45 in accordance with the disclosure of application Ser. No. 613,133 and the newly disclosed surface 50. Generally flat trapezoidal-shaped guide surface 46 slopes upwardly and diagonally rearwardly from surface 45 and merges at its inner end with inboard vertical side surface 48 of head portion 27b of the hook. Surface 46 is disposed entirely inwardly of center plane Y—Y and extends laterally at a considerable degree of angularity with respect to plane Y—Y. Disposed generally intermediate surfaces 34 and 46 is a generally diamond-shaped flat guide surface 49 tapering diagonally downwardly and forwardly from the top surface 36 of hook head portion 27b. Surface 49 merges with surfaces 34 and 46 along generally downwardly and diagonally extending lines 49a and 49b.

Disposed below surface 49 is the generally flat, vertical guide surface 50 extending diagonally rearwardly from front end 33 of the hook and merging at its inner end with diagonal surface 45. It will be seen (Fig. 9) that surface 50 commences substantially at the inner side of plane Y—Y and extends generally diagonally rearwardly therefrom.

Sloping downwardly and diagonally rearwardly from the forward portion of surface 45 is guide surface 52. Surface 52 extends transversely from the inner extremity of surface 38 to the rearward inboard extremity of opening 29. At its bottom extremity, surface 52 merges with undersurface 29a, defining the top of recess 29. Disposed below the rearward portion of the vertical diagonal surface 45, adjacent the side surface 48 of the hook head portion, is a downwardly and diagonally rearwardly sloping guide surface 56. Surface 56 is of substantially trapezoidal, generally flat configuration and merges at its lower extremity with the underside 42 of the hook.

From the foregoing it is evident that the forward face of the hook 27 comprises three series of guide surfaces extending parallel to the planes of its ambit about the pin 17, namely: a middle series of surfaces 45, 50, and 33 generally perpendicular to the plane of the ambit, an upper series of bevel surfaces 46, 49, 34, and a lower series of bevel surfaces 56, 41. All of these surfaces slant laterally outwardly and rearwardly in respective directions from the longitudinal axis Y—Y.

Extending generally laterally from side walls 23 of the coupler head are wings 58 and 59 which not only align opposing couplers for coupling but also provide interlocking means for preventing relative vertical and horizontal movement between the couplers when the latter are in coupled position. Wings 58 and 59 of the instant arrangement are so arranged laterally with respect to the coupler head that the overall transverse dimension of the coupler is not as great as that disclosed in the aforementioned application Ser. No. 613,133, thus providing a more advantageous coupler, so far as angling and interference with the associated car structure is concerned. The latter result is accomplished primarily by decreasing the lateral dimension of the right-hand wing of the coupler, looking at the latter head-on. It will be noted that the coupler face (plate 22) is substantially no wider than the length of the opening 26 as measured in a direction lengthwise of the plane of the pivotal ambit of the hook 27. Further to be noted is that the sloping guide surface of the wings 58 and 59 merge and lead immediately away from the face surface of the head.

Figures 7, 8:
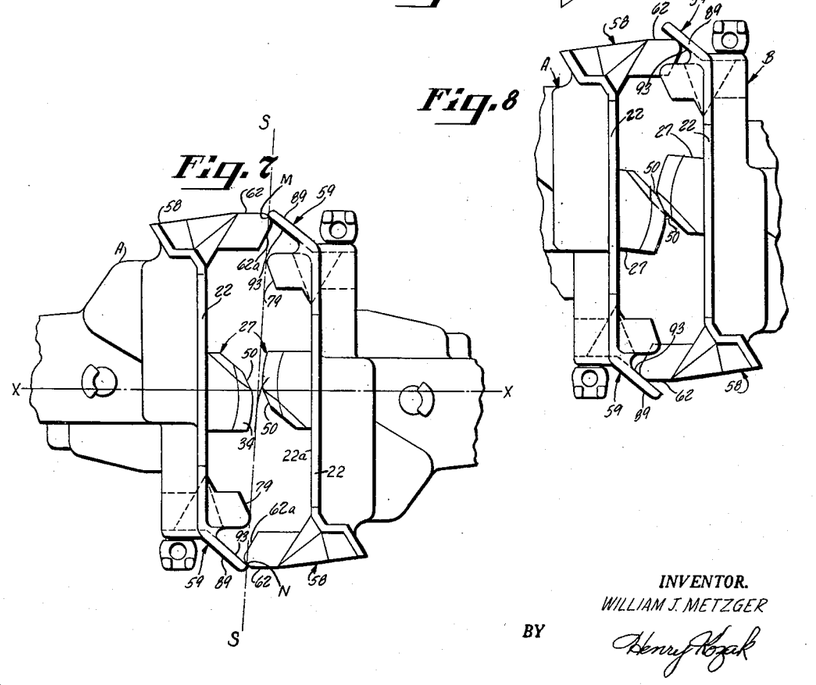
Fig. 7 is a fragmentary plan view similar to Fig. 4 but illustrating the maximum gathering range of opposing couplers when the latter are displaced with respect to said longitudinal center line in a lateral direction opposite to the direction of lateral displacement shown in Fig. 4.
Fig. 8 is a fragmentary plan view showing further aligning of the couplers from Fig. 7 position as they move toward coupled position, and illustrating the engagement between certain of the guide surfaces on the confronting coupling hooks of the couplers to aid in providing smooth and interference-free alignment of the latter during coupling operations.

Wing 58 is formed with a forwardly extending projection 62 (Figs. 1, 2 and 3), disposed adjacent its outer end. The projection has a front face 62a which extends diagonally rearwardly toward the longitudinal center line of the coupler. Projection 62 also has a lateral peripheral surface which, in the embodiment shown, comprises generally horizontal top and bottom surfaces 62b and inner side surface 62c (Figs. 1 and 3). Surface 62c extends substantially directly rearwardly from the inner extremity of front surface 62a and merges at its rearward end with vertically extending diagonal guide surface 64 (Figs. 1 and 3). Surface 64 is substantially parallel to surface 62a and at its rearward end merges into front face plate 22. As can be best seen from Fig. 1 (see also Fig. 4), projection 62 extends forwardly beyond the forward extremity of hook member 27, thus ensuring that the initial contact between opposing couplers that are misaligned the maximum amount permitted by the gathering ranges of the couplers in effecting a coupling operation will occur between the wings of the couplers and not between the coupling hooks thereof as illustrated in Fig. 7.

Disposed above and below projection 62 and sloping rearwardly from the rearward extremities of top and bottom surfaces 62b thereon, are upper and lower aligning surfaces 66, 67, 68, and 69 (Figs. 1 and 3). Upper surfaces 66 and 67 slope upwardly and rearwardly from top surface 62b of the projection and intersect with one another along the diagonally and rearwardly sloping line 70. Bottom surfaces 68 and 69 slope downwardly and rearwardly from the rearward extremity of bottom surface 62b on projection 62 and intersect along diagonally and rearwardly sloping line 72. Lines 70 and 72 commence at a laterally outer extremity of projection 62 and extend toward the vertical longitudinal center plane of the coupler.

Disposed above surfaces 66 and 67 and below surfaces 68 and 69 are pocket portions 74. Each pocket portion 74 comprises vertical rear wall 74a, vertical side wall 74b and a substantially horizontal connecting wall 74c extending forwardly from wall 74a to merge with the rearward extremity of sloping surface 67 or 69, as the case may be. Adjacent the forward extremity of side wall 74b, wing 58 extends forwardly and inwardly toward the face surface of plate 22, both above and below projection 62 to form diagonal guide surfaces 76 for aligning opposing couplers, as will be hereinafter described. Diagonal lines 70 and 72, defining, respectively, the junctures of guide surfaces 66, 67 and 68, 69, merge at their rearward ends with the outer extremities of surfaces 76.

Figure 2:
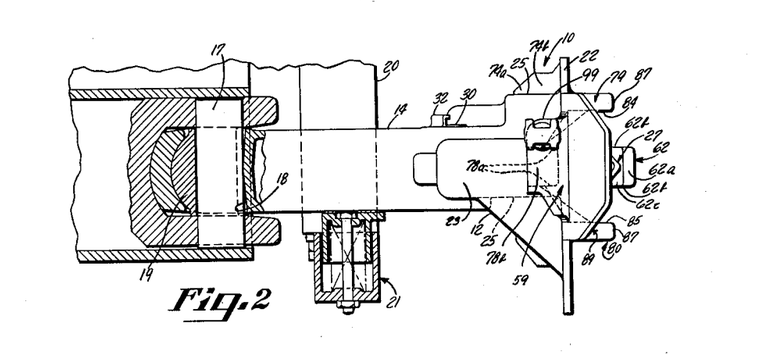
Fig. 2 is a side elevational view, partly in section, of the Fig. 1 arrangement.
Figure 10:
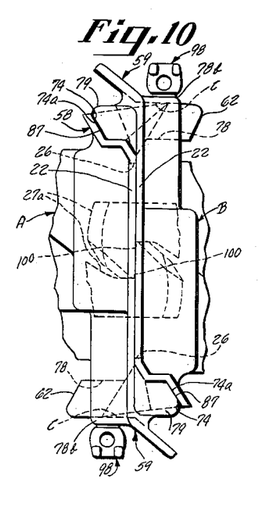
Fig. 10 is a plan view of a pair of opposing couplers in coupled position, the coupling hooks of the couplers being shown in dotted lines and illustrating the tight, surface-to-surface engagement existing between the front face plates of the coupled couplers.

Wing 59 comprises centrally disposed pocket section 78 (Figs. 1 and 3) and vertically spaced, forwardly extending lug portions 79 and 80 located on opposite sides of the pocket section. Pocket section 78 is adapted to receive projection 62 on wing 58 of an opposing similar coupler during coupling operations. Section 78 has a tapered guide surface merging with a non-tapered rearward surface extending perpendicularly to the plane of the face surface of plate 22 which fits the straight-shank portion of projection 62. The non-tapered surface is defined by top and bottom walls 78a and side walls 78b (Figs. 2 and 3). Section 78, while being completely enclosed on the sides thereof, is open at its rearward end and when the couplers are in coupled position, projection 62 on one coupler extends beyond the rearward extremity of the pocket section 78 on the opposing coupler (Fig. 10). Top and bottom pocket walls 78a are adapted for engagement, respectively, with the aforementioned top and bottom surfaces 62b of projection 62 of an opposing coupled coupler, while the inner side walls 78b are engageable with the side surfaces 62c of the projection to prevent substantial relative vertical and horizontal displacement between the couplers when in coupled position. As can be best seen from Fig. 10, a small clearance (as at C, between projection 62 and outer side wall 78b) is provided between projections 62, 79 and 80 and the side walls of respective complementary pockets of coupled couplers to thus prevent the pocket walls from being subjected to any substantial stress during service under draft conditions.

Between lugs 79 and 80, wing 59 comprises a vertically disposed rearwardly and outwardly extending aligning surface 81 which, with respect to an opposed coupled coupler, is sloped complementally to guide surface 64 and parallel to surface 62a on wing 58 of the opposed coupler. Extending forwardly from surface 81 are generally triangularly shaped top and bottom aligning surfaces 82 and 83 which are sloped complementally to, respectively, the upper and lower guide surfaces 67 and 69 on wing 58 for mating engagement on an opposed coupler. Top aligning surface 82 slopes upwardly and merges with the undersurface 84 of upper lug 79 (Fig. 3) while bottom aligning surface 83 slopes downwardly and merges with top surface 85 on bottom lug 80. The front surface 87 on each of projections 79 and 80 is sloped complementally to tapered guide surfaces 76 on wing 58. Each of projections 79 and 80 also comprises an inner side surface 88, which extends substantially directly rearwardly from the inner extremity of front tapered surface 87 on the projection. Surfaces 88 are adapted for engagement with side walls 74b of pocket portions 74 on an opposing similar coupler to prevent relative lateral displacement of the couplers when in coupled position.

It will be seen, therefore, that the pocket and projection structure provided by wings 58 and 59 forms a strong and positive vertical and lateral interlock between coupled couplers. This interlocking of the couplers resists telescoping of associated cars during collisions and derailments and will prevent a pulled-out coupler from dropping to the rail bed and possibly causing a derailment.

In accordance with the invention, an aligning or guide flange 89 extends generally diagonally forwardly from the wall 78b and outwardly from the lugs 79 and 80, thereby forming the outer end portion of the wing 59. The forward end of flange 89 may extend (as shown) forwardly of face plate 22 substantially the same amount as do projections 79 and 80, with said end being disposed generally rearwardly of the front end of coupling hook member 27. The top and bottom edges of flange 89, commencing from the outer extremities thereof, diverge generally rearwardly and merge with face plate 22. Adjacent the outboard extremities of surfaces 84 and 85 on projections 79 and 80, respectively, flange 89 is provided with generally triangularly shaped top and bottom guide surfaces 90 and 92. Surfaces 90 and 92 are of generally slightly concave configuration in a transverse direction and slope generally diagonally rearwardly to merge with the aforementioned surfaces 82 and 83, respectively. Adjacent to the top of the guide surface 90 and the bottom of guide surface 92, flange 89 curves generally forwardly and merges respectively with the outboard sides of projections 79 and 80. The function and operation of guide surfaces 90 and 92 will be hereinafter more specifically described.

Flange 89 presents a generally flat, forwardly facing aligning and gathering surface 93. It will be noted that flange 89 is of sufficient vertical extent to provide for engagement during coupling operations between its front surface 93 and the projection 62 of an opposing similar coupler for all possible vertically misaligned positions of the coupler. It will also be understood that the vertical and lateral gathering or funneling characteristics of the flange permits the pocket portion 78 on wing 59 to be completely enclosed on the outboard side thereof. Without flange 89, pocket portion 78 would have to be open at its outer side in order to be able to positively receive projection 62 on an opposing coupler during coupling operations for all possible angled positions of the couplers.

The gathering and aligning characteristics of flange 89 will hereinafter be more thoroughly described.

As can be best seen from Fig. 3, and in accordance with the disclosure of aforementioned application Ser. No. 613,133, the train service line connections are formed integrally with the front face plate of the car coupler. Numerals 94, 95 and 96 designate, respectively, electrical, air and steam line connections for the train. When two opposing couplers meet for coupling, the aforementioned connections on one coupler are automatically lined and coupled with those on the opposing coupler, thus avoiding flexible hose couplings and eliminating manual coupling of the service line connections between the cars.

The uncoupling rotor shaft member 98 is rotatably mounted partially by extension through a wall portion 99 (Fig. 2) contiguous with the outboard wall 78b of pocket 78 on wing 59, and extends through side wall 23 of the coupler head in the vicinity of offset upper chamber portion 25a, thereof. Shaft 98 comprises eye portion 98a which is adapted for connection to any suitable uncoupling mechanism, such as an uncoupling rod, for actuating the operating parts of the coupler. The internal operating mechanism of the coupler and its actuation are identical to that of aforementioned application Ser. No. 613,133 and accordingly will not be described here.

Figure 4:
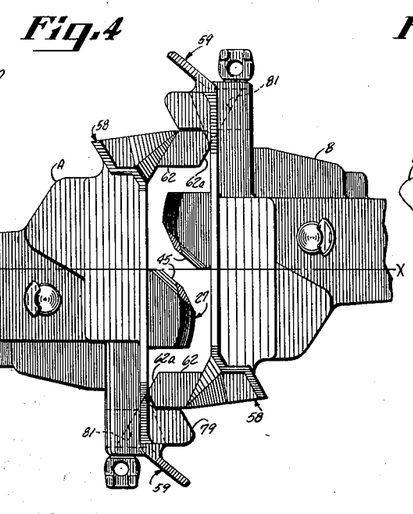
Fig. 4 is a fragmentary plan view illustrating generally the maximum gathering range of opposing couplers when laterally displaced at opposite sides of a longitudinal center line which extends approximately through the pivotal centers of the couplers in coupled position.

The horizontal gathering ability of the coupler, which forms an important feature of the present invention, is particularly illustrated in Figs. 4 to 7, inclusive, of the drawings, where two opposing couplers A and B are shown in the process of coupling. As seen in Fig. 4, the initial point of contact between couplers A and B displaced to opposite sides of a longitudinal center line X—X connecting the pivotal centers of the couplers substantially the maximum amount (which in the present embodiment is three inches) as they move toward one another for coupling, occurs between the forward end surfaces 62a of projections 62 on wings 58 and the inboard extremities of rearwardly sloping surfaces 81 on wings 59 on the opposing couplers. Upon further movement of the couplers toward one another to the Fig. 5 position, the beveled surfaces 45 on coupling hooks 27 engage and slide transversely of one another, thus exerting a lateral force that causes the hooks to be swung outwardly against the pressure of hook-actuating springs 36 to the position shown in Fig. 6.

Figure 6:
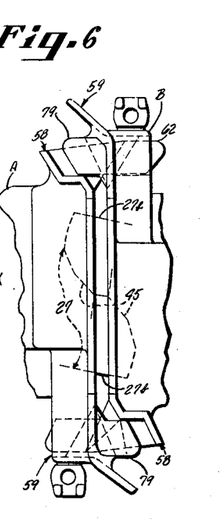
Fig. 6 is a fragmentary plan view showing movement of the couplers following that of Fig. 5, the interlocking projections on the aligning wings of the couplers having commenced to enter the complementary recesses in the opposing coupler.

In the latter position, the head portion 27b on each hook has moved almost entirely past the head portion of the opposing coupler. Moreover, relative sliding between complementary surfaces 62a and 81 has caused couplers A and B to move generally transversely of one another toward aligned position. As movement of the couplers continues, they become positioned as shown in Fig. 6, wherein the couplers are aligned and the projections on one coupler have entered the complementary pocket portions on the opposing coupler. It will be understood that considerable clearance exists between the face plates 22 of the opposing couplers after they have become aligned and the forwardly extending projection 62 on one coupler has just commenced to enter the pocket portion 78 on the opposite coupler. Thus, final movement of the couplers into coupled position will be a longitudinally straight forward motion of considerable magnitude, thereby eliminating the possibility of injury to the aforementioned train service line connections on the front face plates of the couplers, as might not be the case if the couplers came to their final coupled position in a sidewise direction.

With the couplers in final coupled position, as shown in Fig. 10, the face plate 22 on one coupler is in tight engagement with the face plate on the opposing coupler. It will be seen that the coupling hook 27 is so disposed with respect to front face plate 22 that when two couplers are in coupled position (coupling surface 100 on one hook being in full bearing contact with surface 100 on the opposing hook), the face plates 22 thereof are in the aforesaid tight surface-to-surface engagement. Furthermore, the projections 62, 79 and 80 on one coupler are disposed respectively in pocket portions 78, 74 and 74 on the opposing couplers to prevent relative vertical and lateral movement between the couplers. It will also be seen that in coupled position, the coupling hook 27 on one coupler extends through the opening 26 in the face plate of the opposing coupler to supplement the complementary projection and pocket structure on the wings 58 and 59 of the couplers, to additionally aid in interlocking the couplers against relative vertical displacement.

From the foregoing, it will be understood that the novel coupler will couple automatically upon being brought together with an opposing similar coupler without the necessity of any prior actuation of, or attention to the coupler. The coupler is at all times in readiness for coupling without the necessity of a train man having to set or position the coupler parts prior to coupling operation.

It is to be understood that buffing forces between coupled couplers are applied solely to the front face plates 22, thus avoiding any bending stresses on the aligning wings 58 and 59. In this connection, clearance is provided between surface 87 on projections 79 and 80 and the opposing wall 74a on wing 58 of the coupler. Pulling or draft forces are transmitted directly through coupling hooks 27 to pivot pins 30.

When it is desired to uncouple a pair of coupled couplers A and B (Fig. 10), the uncoupling rod (not shown) of one of the couplers is actuated, thus rotating rotor shaft member 98 and thereby actuating the operating mechanism of the coupler in a manner similar to that described in aforementioned application Ser. No. 613,133.

Figure 5:
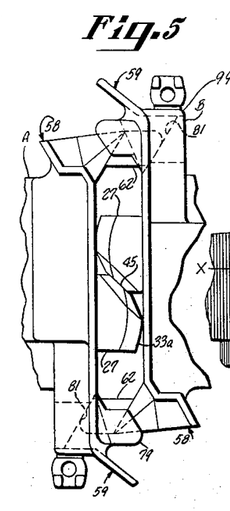
Fig. 5 is a fragmentary plan view showing further gathering of the couplers from the Fig. 4 position as they move toward coupled position.

Figs. 7 and 8 illustrate a condition where the couplers are again laterally displaced at one extremity of their horizontal gathering ranges, but the lateral displacement of each coupler is on the opposite side of the longitudinal center line X—X from that shown in Figs. 4 and 5. As seen in Fig. 7, engagement between the couplers, as they move toward one another for coupling, initially occurs between the front end of projection 62 of each coupler and the front surface 93 on the diagonally extending flange 89 of the opposing coupler. It will be noted that in the latter position, when the projection 62 and flange 89 of one coupler engage the flange 89 and the projection 62, respectively, of the other coupler (see Fig. 7) a clearance exists between the confronting coupling hooks 27 of the couplers. Fig. 7 further illustrates that the projection 62 and the flange 59 of each coupler extend forwardly from the plane of the front face surface 22a of the plate 22 to the plane S—S and that the plane S—S is spaced forwardly from the hook of each coupler in respect to its forward longitudinal direction.

Generally diagonally sliding movement of the couplers with respect to one another then occurs as the couplers move toward aligned position, until engagement between the confronting tapered surfaces 50 of the hooks of the couplers occurs, as shown in Fig. 8. The latter engagement causes the coupling hooks to pivot slightly outwardly as relative transverse sliding movement occurs progressively between surfaces 50 and 45 on each of the hooks until the projection 62 on each coupler commences to enter pocket portion 78 on the opposing coupler, after which the head portions 27b of the hooks slide by one another as the couplers move into final coupled position. Surfaces 50 are generally complementary to one another to thus insure smooth and interference-free cooperation between the hooks during alignment of the couplers. With the coupling surfaces 100 on one hook being in full bearing contact with surface 100 on the opposing hook, and the pocket and projection structure on the wings of the couplers in interlocking engagement (Fig. 10), the couplers are in fully coupled position.

Figure 11:
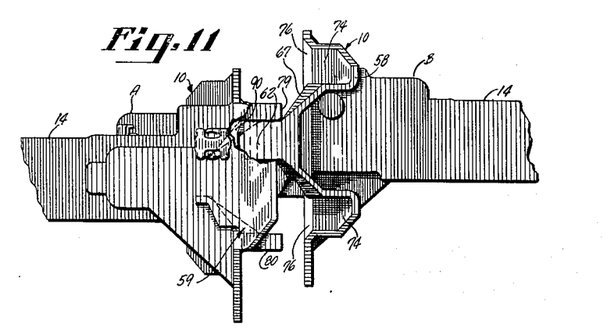
Fig. 11 is a side elevational view partly in section, illustrating the maximum vertical gathering range of opposing couplers, the latter also being misaligned laterally, to show the aligning ability of the novel arrangement of guide structure on the wings of the couplers.
Figure 12:
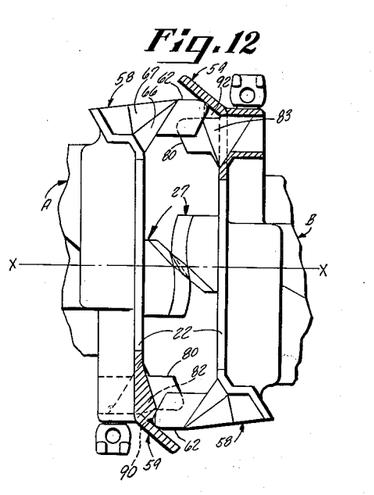
Fig. 12 is a fragmentary plan view, partly in section, of the Fig. 11 position of the couplers.

Another important feature of the invention resides in the ability of the couplers to couple when displaced vertically or both vertically and laterally with respect to one another. Figs. 11 and 12 illustrate the condition where a pair of couplers A and B are not only displaced vertically the maximum amount (which in the present embodiment is approximately 6″) with respect to one another but also are angled laterally to opposite sides of the longitudinal center line X—X connecting the pivotal centers of the couplers, the latter mentioned views illustrating in particular the aligning action of the aforementioned top and bottom guide surfaces 90 and 92 on wing 59 of the coupler. As shown in Figs. 11 and 12, the contact between the couplers as they move toward one another for coupling occurs between the outer extremity of projection 62 of wing 58 of coupler B and the upper triangular guide surface 90 on wing 59 of coupler A, and between the outer extremity of projection 62 on wing 58 of coupler A and the lower triangular guide surface 92 on wing 59 of coupler B. It will be seen from Fig. 12 that in the latter position the coupling hook 27 on coupler B overlies, in spaced relationship, the hook on coupler A. Upon further movement of the couplers toward one another, the projections 62 slide rearwardly over the guide surfaces 90 and 92 and thereafter projection 62 of coupler B moves into sliding engagement with top aligning surface 82 on coupler A and projection 62 on coupler A moves into sliding engagement with bottom aligning surface 83 on coupler B.

Engagement may also occur between projection 79 on wing 59 of coupler A and the upper guide surface 69 on wing 58 of coupler B and/or between projection 80 on wing 59 of coupler B and the opposing bottom guide surface 67 on wing 58 of coupler A, depending on the extent of vertical angling of the couplers with respect to their associated cars. If the latter engagement occurs, it will be apparent that the improved disposition of surfaces 67 and 69, wherein the juncture lines 70 and 72 thereof commence at the outboard extremity of projections 62, provides for improved "vertical pick-up" of the couplers over that possessed by the arrangement of aforementioned application Ser. No. 613,133, as the couplers align vertically for coupling. The couplers then move vertically and longitudinally relative to one another until the projections on one coupler enter the complementary pocket portions of the opposing coupler to thereby complete the coupling operation. It will be seen, therefore, that guide surfaces 90 and 92 in conjunction with flange 89 on wing 59 of the coupler will provide for efficient and facile aligning of opposing couplers when the latter are laterally and vertically displaced with respect to one another during coupling operations.

Figure 13:
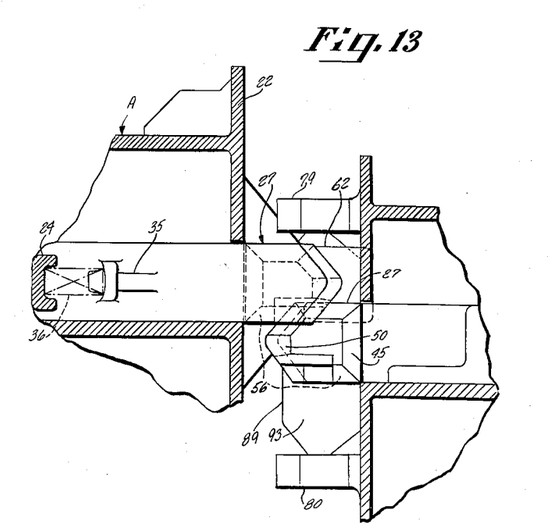
Fig. 13 is a fragmentary sectional side elevational view showing positions of the couplers after movement from positions as shown in Figs. 11 and 12, but with both couplers inverted from the general position as shown in Fig. 11 to illustrate the engagement between certain of the guide surfaces on the coupling hooks of the couplers which causes relative, generally transverse movement between the hooks and thus permits further facile movement of the couplers toward aligned and coupled positions.

During the latter described alignment of the couplers, the coupling hook of one coupler will move into engagement with the hook on the opposing coupler in generally overlapping relationship therewith, as will be best understood from Fig. 13. Fig. 13 illustrates generally the movement of couplers following that of Figs. 11 and 12 but with the vertical relationship between the couplers reversed (coupler A being displaced above coupler B) from that shown in the latter figures. The purpose in so reversing the vertical relationship of the couplers is to better illustrate the cooperation between certain of the guide surfaces on the coupling hook members 27 of the couplers.

The aforementioned upper guide surfaces 46 and 49 and lower guide surfaces 52 and 56 on the head portions 27b of each of the hook members insures that relative sliding will occur between the hooks as the couplers move vertically and transversely of one another during aligning operations. Fig. 13 illustrates the engagement between upper surface 46 on hook 27 of coupler B and lower surface 52 on the coupling hook of coupler A.

Surfaces 46 and 52 are formed generally complementary to one another and, as the couplers move into alignment, the latter mentioned surfaces slide generally transversely relative to one another in substantially full surface-to-surface engagement until surface 56 on hook 27 of coupler A engages upper guide surface 49 on the hook of coupler B. Thereafter surfaces 56 and 49 (which are also formed generally complementary to one another) slide transversely with respect to one another as the couplers move toward lateral and vertical alignment, until side surfaces 45 on the hooks engage. With the aforedescribed relative sliding between the specified hook surfaces, the hooks will be forced to pivot slightly outwardly as the head portions of the hooks move past one another into coupling position.

It will be understood, therefore, that upper bevel surfaces 46 and 49 on one hook and lower bevel surfaces 52 and 56 on the other hook provide generally flat surface-to-surface engagement between the hooks as the couplers move into alignment and thereby ensure that interference and point or line contact (excessive bearing pressure) between the latter will not exist, to thereby provide an easier coupling and longer wearing mechanism.

Lower bevel surfaces 38 and 41 and upper bevel surface 34 on the front face of the hook of the coupler function as guiding surfaces which engage portions of the periphery of the opening 26 to prevent any binding or blocking as the hook enters the opening 26 of the opposing coupling.

Figure 14:
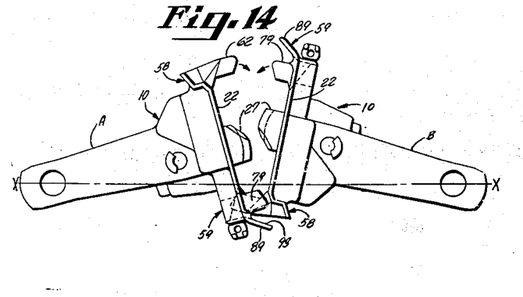
Fig. 14 is a plan view illustrating the engagement between a guide surface on a wing of one of the couplers and a projection on the opposing coupler to provide for maximum gathering movement of the couplers when laterally angled to the same side of the longitudinal center line connecting the pivotal centers of the coupler.

Fig. 14 generally illustrates the maximum gathering range of the couplers when the latter are angled laterally to the same side of the center line X—X connecting the pivotal centers of the coupler, it being assumed, for purposes of illustration, that the vehicles to which the couplers are attached are in longitudinal alignment. Projection 62 on wing 58 of coupler B initially moves toward coupler A inboardly of flange 89 of coupler A and engages aligning surface 81 on the wing, after which the couplers are caused to pivot in the direction of the arrows into aligned position for coupling.

It will be understood, of course, that if the vehicles, to which the couplers shown in Fig. 14 are attached, were disposed on a curve instead of being in longitudinal alignment, as illustrated, then projection 62 of coupler B might initially engage the front surface 93 of aligning flange 89 on wing 59 of coupler A, slide transversely across surface 93 while causing coupler A to rotate horizontally toward the center line X—X connecting the pivotal centers of the couplers and then engage the aforementioned surface 81, after which the couplers would be caused to pivot in the direction of the arrows in a similar manner as above. Thus, flange 89 provides increased gathering range for opposing couplers when the latter are angled a substantial amount to the same side of a line connecting their pivotal centers, as well as those angled to opposite sides of such a line.

From the foregoing description and accompanying drawings, it will be readily understood that a novel, relatively lightweight tight-locking coupler, which has improved aligning and gathering characteristics in both vertical and horizontal directions and couples automatically upon impact is provided by the invention. The coupler comprises a rotatable coupling hook member which embodies a novel arrangement of guide surfaces on the front face thereof to aid in accomplishing positive and efficient aligning of opposition couplers when the latter are relatively displaced laterally or vertically, or both. Moreover, the aligning wings in the instant coupler comprise improved aligning and gathering surfaces including, on one wing, aligning flange having a front abutment surface.

The terms and expressions which have been employed are used as terms of description and not of limitation and there is no intention, in the use of such terms and expressions of excluding any equivalents of the features shown and described or portions thereof, but it is recognized that various modifications are possible within the scope of the invention claimed.

What is claimed is:

1. A car coupler comprising: a hollow head having a generally flat front face surface adapted for tightly engaging the corresponding surface of another similar coupled coupled therewith; coupling means anchored in said head and projecting outwardly therefrom forwardly and centrally through said front face in the longitudinal direction of the coupler for interlocking with the coupling means of another similar coupler with associated front face surfaces in opposed mating relationship; and means for aligning said couplers with each other during a coupling operation comprising a pair of wings, each wing extending laterally from one of opposite sides of the head; one of the wings having a projection extending forwardly of said surface; the other wing comprising a forwardly facing pocket having side walls extending rearwardly of said surface which provide a substantially continuous periphery, and a guide flange extending forwardly and laterally outwardly from a laterally outward portion of said periphery; said projection and pocket being adapted to mate with the pocket and projection, respectively, of a similar coupler when said couplers are in engaged face-to-face relation, said projection and flange extending forwardly from the plane of said front face surface into a plane spaced forwardly of said coupling means.

2. The car coupler of claim 1, wherein: the wing having said projection comprises two pockets extending rearwardly of said face surface spaced above and below the projection; the other wing has two projections extending forwardly of the face surface above and below said pocket of the wing, thereby adapting the coupler to be coupled with a similar coupler with the non-similar wings of the couplers in mating relationship; said wing having a single projection also having a guide surface sloping rearwardly from the projection toward each of the pockets thereof; and the other wing having guide surfaces sloping rearwardly from each of its two projections and from said face surface rearwardly toward said pocket thereof, said flange extending forwardly and laterally outwardly from the laterally outward side of said pocket.

3. The car coupler of claim 1 wherein: said coupling means is a hook member pivotally anchored within the head; said front face surface has an opening providing an ambit for lateral pivotal movement of the hook member along a plane normal to the pivot axis of the member; said member extends forwardly through and beyond the opening; said wings are attached to said head along opposite edges of said face surface which extend transversely to the plane of said ambit, and said edges are at opposite ends of the opening; said pocket having a guide surface tapering rearwardly from a larger periphery which includes a portion of the adjacent edge of said edges and extends laterally between the ends of said edge portion and spaced points on said flange; said guide surface merging along a smaller periphery with a substantially peripherally continuous side surface extending perpendicularly to the plane of said face surface; said projection having a straight shank portion complementary to said side surface.

4. The coupler of claim 3 wherein: the hook member comprises a rearward body portion pivotally connected to the coupler head along said pivot axis and a hook-shaped head portion extending forwardly beyond the plane of said front surface of the plate; the forward face of the head portion comprising a plurality of flat guide surfaces disposed on both sides of a longitudinal axis passing through said pivot and said forward face of the member; said guide surfaces comprising three series of surfaces extending generally parallel to the plane of the ambit, namely; a middle series of which each surface is generally perpendicular to the plane of said ambit, and a series of bevel surfaces on each side of the middle series; said surfaces of all series extending rearwardly and laterally outwardly in respective directions away from said longitudinal axis of the member.

5. The coupler of claim 3 wherein: the forwardly-facing crown of the hook-engaging portion of said member is characterized by three series of guide surfaces, namely: a middle series substantially parallel to the pivot axis of the member and upper and lower series of marginal bevel surfaces along each side of the middle series; said surfaces of all series inclining laterally outwardly and rearwardly from a longitudinal axis of the member passing through its pivotal axis and centrally through said crown.

6. Interlocking and aligning means for a car coupler comprising: a wing extending laterally from the coupler head, said wing comprising a pair of vertically spaced pocket portions; a projection positioned intermediate said pocket portions, said pocket portions being spaced rearward of said projection; a pair of guide surfaces disposed above said projection and a pair of guide surfaces disposed below said projection, said surfaces of each of said pairs being disposed laterally of one another and extending between said projection and the corresponding adjacent pocket portion, each of said surfaces being sloped rearward and diagonally in a transverse direction and being adapted for sliding engagement with an opposing car coupler during coupling operations to vertically and laterally align the couplers for coupling, said surfaces of each of said pairs intersecting along a diagonally and rearward sloping line, said line commencing at the outboard extremity of said projection and extending inwardly toward the longitudinal vertical center plane of the coupler; each of said pocket portions and said projection being adapted to cooperate, respectively, with a pair of projections and a pocket portion on an opposing coupler to limit any relative lateral movement between the couplers after the latter are in coupled position.

7. Interlocking and aligning means for a car coupler comprising: a head; a wing extending laterally from the coupler head, said wing comprising a substantially vertically extending rearward and outward sloping guide surface; a pocket portion extending rearward from said surface; a pair of vertically spaced projections, said projections being disposed above and below said pocket portion and being disposed forwardly thereof; other guide surfaces being disposed above and below said pocket portion and extending, respectively, between the upper and lower extremities of said first-mentioned surface and the associated one of said projections, said second-mentioned surfaces sloping rearward and diagonally in a transverse direction; another guide surface juxtaposed by each of said second-mentioned surfaces and disposed, respectively, below and above the associated one of said projections, said last-mentioned surfaces being of slightly concave configuration in a transverse direction; said first, second and third-mentioned surfaces being adapted for sliding engagement with an opposing car coupler during coupling operations to vertically and laterally align the couplers for coupling, each of said projections and said pocket portion being adapted to cooperate, respectively, with a pocket portion and a projection on an opposing coupler to limit relative vertical and lateral movement between the couplers after the latter are in coupled position.

8. Interlocking and aligning means in accordance with claim 7 wherein: said pocket portion is partially defined by an outboard side wall and said wing comprises a flange extending forwardly and laterally outwardly from said outboard wall and with its top and bottom edges merging with the outer sides of said projections.

9. A tight-locking car coupler comprising: a head; said head having a generally flat front face plate defining the forward extremity thereof; a spring-actuated coupling hook member pivotally mounted in said head and extending forwardly through an opening in said plate; wings extending laterally from opposite sides of said head for gathering and aligning the coupler during coupling operation, one of said wings comprising a pocket portion and projecting lug portions disposed above and below said pocket portion; and a flange extending generally diagonally forwardly and laterally outwardly from the outer side of said pocket, said flange being disposed entirely outwardly of said lug portions and having a vertical dimension at least as great as the vertical spacing between said lug portions; the other wing having a projection aligned transversely of the coupler and said pocket to fit the corresponding pocket of another similar coupler coupled to said coupler; said projection and flange extending forwardly from the plane of said front face surface into a plane spaced forwardly from said hook member.

10. A tight-locking car coupler comprising: a head, said head having a generally flat front face plate defining the forward extremity thereof; a spring-actuated coupling hook member pivotally mounted in said head and extending forwardly beyond said plate through an opening thereof; wings extending laterally from opposite sides of the head for gathering and aligning the coupler during coupling operations, each of said wings comprising projection means extending forwardly of said plate and pocket means extending rearwardly from the plate at a different level than that of the projection means for engaging complementary pocket and projection means, respectively, on each of the wings of a similar opposing coupler to prevent relative vertical and lateral displacement of the couplers when in coupled position; one of said wings comprising a generally diagonally-extending flange thereon projecting generally forwardly and outwardly from the outer side of its pocket means, said flange presenting a substantially flat guide surface disposed outboardly of said projection means on said one wing and converging into juncture with a rearward portion of the pocket means, other guide surfaces extending from the projection means into the pocket means on the same wing, said flange guide surface merging with said other guide surfaces to provide a funnel-like area for receiving the projection means of an opposing misaligned car coupler during coupling operations, said flange of said one wing and the projection means of the other wing of said coupler extending forwardly from the plane of said face plate into a plane spaced forwardly from said hook member.

11. A tight-locking car coupler comprising: a head having a generally flat front face plate defining the forward extremity thereof; a coupling hook member pivotally mounted in said head and extending forwardly through an opening in said plate, said hook comprising a forwardly facing recess in the front face thereof for receiving an actuating member of an opposing similar coupler when the couplers are in coupled position; wings extending laterally from opposite sides of said head, one of said wings comprising a projection portion and a pocket portion disposed above and below said projection portion; a pair of guide surfaces disposed above said projection and a pair of guide surfaces disposed below said projection, said surfaces of each of said pairs intersecting along a diagonally and rearward sloping line commencing at the outboard extremity of said projection and extending inwardly toward the longitudinal vertical center plane of the coupler; the other of said wings comprising a pocket portion and forwardly projecting lug portions disposed above and below said last-mentioned pocket portion; a pair of guide surfaces respectively disposed above and below said second-mentioned pocket portion, each sloping diagonally and rearwardly from its respective lug toward the horizontal center plane of the coupler; an aligning flange extending diagonally forwardly laterally outwardly from the outer side of the pocket portion of the last-mentioned wing, said flange comprising a generally forwardly facing abutment face and a pair of vertically spaced, relatively small, generally-concave guide surfaces extending outboardly of each lug portion between upper and lower extremities of the flange face and said upper and lower guide surfaces adjacent the pocket portion of the last-mentioned wing; the front face of said hook member comprising a plurality of generally bevel guide surfaces along its upper and lower margins, all of said bevel guide surfaces being engageable in sliding relationship with those of an opposing car coupler during coupling operations to facilitate alignment of couplers for coupling.

12. A car coupler in accordance with claim 11 wherein: said front face of said hook comprises a plurality of generally vertically extending crown guide surfaces disposed intermediately said upper and lower bevel surfaces.

13. A coupling hook for a car coupler of the type described comprising: a body portion having a vertically extending pin-receiving opening adjacent the rearward end thereof and a head portion at its forward end, said head portion having a recess in the front face thereof for receiving an actuating member on an opposing similar coupler when the couplers are in coupled position; said face being beveled with a series of substantially flat juxtapositioned upwardly and rearwardly extending guide surfaces and a series of substantially flat juxtapositioned downwardly and rearwardly facing guide surfaces, respectively, along the top and lower margins of said face to allow the upper or the lower of said surfaces to engage in generally complementary face-to-face sliding relationship, the lower or the upper of said surfaces, respectively, on the hook of a similar opposing misaligned coupler through successive stages of a coupling operation.

14. The coupling hook of claim 13 wherein: said recess occurs in the lower portion of said face and said lower guide surfaces include surfaces disposed above said recess and merging with the top periphery of the latter at their bottom extremities, said guide surfaces merging with the recess periphery being engageable in substantially flat sliding relationship with certain of said upwardly facing guide surfaces on the hook of a similar opposing coupler during coupling operations to aid in aligning the couplers from vertically and laterally misaligned positions.

15. The coupling hook of claim 14, wherein: said guide surfaces include a pair of surfaces, each of which is disposed between one side of the recess and one side of the hook entirely below the level of said surfaces which merge with the top periphery of the recess.

16. A tightlocking car coupler comprising: a head having a generally flat front face plate; a coupling hook pivotally mounted in said head and extending forwardly through an opening in said plate, said hook having a coupling surface thereon which is substantially coplanar with the front surface of said plate; said coupler having means for aligning it with a similar opposing coupler comprising wings extending laterally from both sides of said plate, each of said wings having a forwardly facing pocket portion and at least one forwardly extending projection thereon for mating with, respectively, the projection and pocket of a similar coupler in tight fitting complementary relationship when the couplers are in coupled position; the pocket portion of one of said wings comprising an aligning flange extending generally diagonally forwardly and outwardly from its outer side; the projection of the other wing being related vertically and laterally with respect to the face plate and said pocket portion of said one wing to mate with the corresponding pocket portion of an opposed coupler; said flange of the one wing and said projection of said other wing extending forwardly from the plane of said front surface into a plane spaced forwardly of said hook and said plate.

References Cited in the file of this patent
UNITED STATES PATENTS

| | | |
|---|---|---|
| 1,891,660 | Tomlinson | Dec. 20, 1932 |
| 2,162,390 | Rydin | June 13, 1939 |
| 2,178,062 | Bazeley | Oct. 31, 1939 |
| 2,825,473 | Metzger | Mar. 4, 1958 |

UNITED STATES PATENT OFFICE
CERTIFICATION OF CORRECTION

Patent No. 2,963,174                December 6, 1960

William J. Metzger

It is hereby certified that error appears in the above numbered patent requiring correction and that the said Letters Patent should read as corrected below.

Column 7, line 46, for "8he" read -- The --; column 9, line 52, after "couplers." insert the following paragraph:

Assuming the center line X-X in horizontal alignment, a plane S-S in transverse relation with the center line extends vertically through the clearance between the hooks 27 thereof and points N, M, of engagement of the two couplers is established as the tip of the projection 62 of one coupler engages the flange 59 of the other coupler along a forward marginal portion of the inner surface 93 at one extreme in the gathering range of the two couplers.

column 10, lines 41 and 42, for "projections" read -- projection --.

Signed and sealed this 6th day of June 1961.

(SEAL)
Attest:

ERNEST W. SWIDER
Attesting Officer

DAVID L. LADD
Commissioner of Patents